June 10, 1924.
P. G. LUCAS, JR
1,497,377
FISHING TACKLE BOX
Filed March 15, 1920
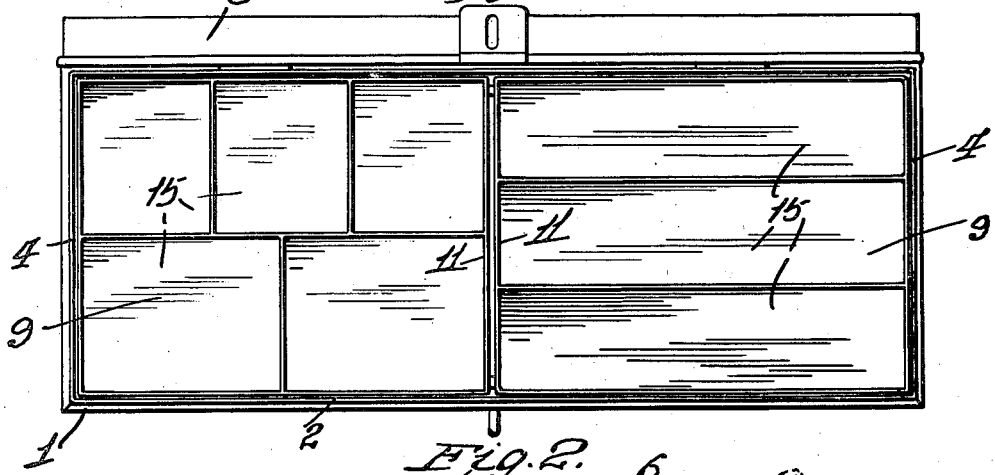
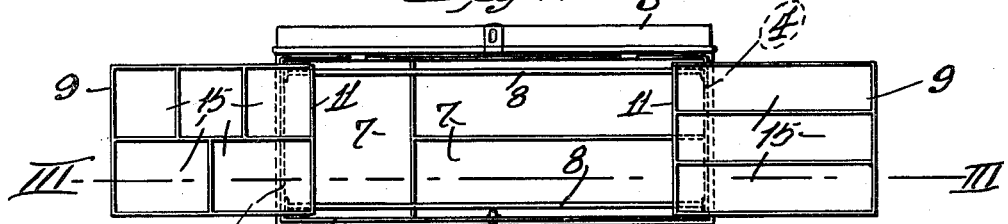
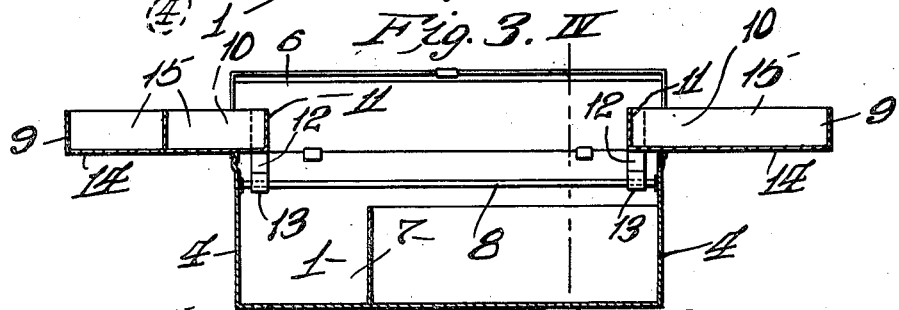
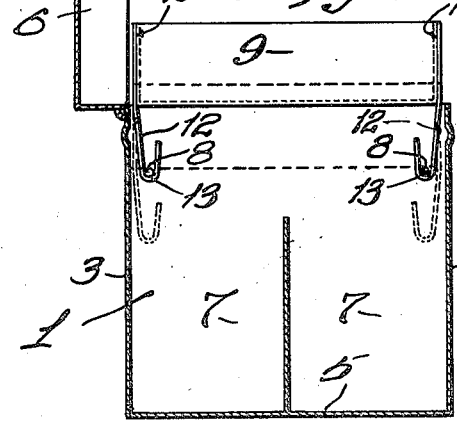
Inventor:
Philip G. Lucas Jr.
By L. G. Fletcher
atty Patented June 10, 1924.

1,497,377

UNITED STATES PATENT OFFICE.

PHILIP G. LUCAS, JR., OF ST. LOUIS, MISSOURI.

FISHING-TACKLE BOX.

Application filed March 15, 1920. Serial No. 365,871.

*To all whom it may concern:*

Be it known that I, PHILIP G. LUCAS, Jr., a citizen of the United States of America, and a resident of the city of St. Louis and State of Missouri, have invented certain new and useful Improvements in a Fishing-Tackle Box, of which the following is a specification.

The primary object of this invention is to provide an improvement in fishing tackle boxes in which the upper trays thereof, while being movable from the box, are movably secured to the box.

Another object of the invention is to provide an improvement relative to the movable trays of the fishing tackle box so that the trays can be removed from the box and held therefrom in upright positions so that access is provided to the lower compartments of the box.

Other and further objects will appear in the specification and be specifically pointed out in the appended claims, reference being had to the accompanying drawings exemplifying the invention, and in which, Figure 1 is a plan view of the fishing tackle box, the lid being shown in open position.

Figure 2 is a plan view of the box on a reduced scale showing the trays removed from above the lower compartments of the box and suspended from the end walls of the box.

Figure 3 is a longitudinal section on a reduced scale taken on the line III—III of Fig. 2.

Figure 4 is a vertical transverse section taken on the line IV—IV of Fig. 3.

Referring to the drawings, the fishing tackle box 1 has front and rear walls 2 and 3, end walls 4, bottom 5, and hinged to the rear wall 3 is a lid 6.

Formed in the box adjacent the bottom 5 are a series of compartments 7 in which may be contained the reels and lines of a fisherman's outfit. Arranged inside of the box 1 above the compartments 7 are a pair of horizontally and longitudinally arranged guiding and supporting members 8, said members being for the support of a pair of trays 9 when said trays are mounted inside of the box.

Depending from each side wall 10 of each of the trays near the ends 11 thereof, which are adjacent, is a retaining portion 12, having an underlapping portion 13, each underlapping portion being engaged under each of the members 8 as shown in Fig. 4 when the trays are in lifted position. These depending portions 12, a pair of which is carried by each tray 9 in connection with the members 8 serve to prevent the trays from becoming separated from the box so that they will not be lost when the tackle box is in use, as it is well known how detached parts from a main article are lost during a fishing trip.

In carrying out the operation of this improvement, when access to the fishing tackle box is desired, the lid 6 of the box is swung open, then each tray 9 is engaged and lifted and moved in opposite directions for engaging the bottom 14 of each tray above the upper edge of the respective end walls 4 of the box during which the underlapping portions 13 of the retaining portions 12 engage against the under side of the respective guiding members 8, thereby limiting the upward lifting of the trays, said members 12 also preventing the trays from being moved endwise of the box, for if pulled outwardly too far, the members 12 will engage against the respective end walls 4.

When the trays have been moved to the positions just described as shown in Figs. 2 and 3, access is provided to the lower compartments 7 as well as to the divisional pockets 15 of the trays 9, said pockets 15 being for the purpose of containing fishing hooks, flies, sinkers and the like.

From the aforesaid it is to be noted that when the box is completely open for displaying the trays while being movable are yet secured to the main body portion or box so that they cannot become detached or lost.

What I claim is:

1. A fishing tackle box having a compartment, a pair of longitudinally arranged members located in said box above said compartment, a movable tray located above said compartment having a pair of depending hook shaped portions each being in engagement with a respective one of said members, said depending portions of said tray and said members providing means whereby said tray can be moved from above said compartment and extended in its upright position from said box.

2. A fishing tackle box having a plurality of compartments formed therein, a pair of movable trays located in said box above said compartments, a longitudinally arranged member located beneath said trays in engagement with a depending hook-shaped portion formed on each of said trays, said trays adapted to be oppositely extended from above opposing walls of said box and seated thereon, the hook-shaped portions of said trays and said member providing means for holding said trays upright when extended from said box.

3. A fishing tackle box having end walls and lower arranged compartments, movable trays located above said compartments, a pair of paralleling and longitudinally arranged members located in said box beneath said trays, each of said trays having a pair of depending hook-shaped portions which extend beneath said longitudinally arranged members, said trays adapted to be lifted upwardly from above said compartments and extended from said box over the end walls thereof, said depending portions adapted to engage the under side of said members and hold said trays in extended positions.

PHILIP G. LUCAS, Jr.